US007543144B2

(12) United States Patent
Rensin et al.

(10) Patent No.: US 7,543,144 B2
(45) Date of Patent: Jun. 2, 2009

(54) SYSTEM AND METHOD FOR LOST DATA DESTRUCTION OF ELECTRONIC DATA STORED ON PORTABLE ELECTRONIC DEVICES

(75) Inventors: David K. Rensin, Waterford, VA (US); John W. Hanay, Palo Alto, CA (US); Cuong G. Williams, Washington, DC (US); Yuri Yuryev, San Mateo, CA (US)

(73) Assignee: Beachhead Solutions, Santa Clara, CA (US)

( * ) Notice: Subject to any disclaimer, the term of this patent is extended or adjusted under 35 U.S.C. 154(b) by 860 days.

(21) Appl. No.: 10/897,964

(22) Filed: Jul. 21, 2004

(65) Prior Publication Data
US 2006/0021007 A1 Jan. 26, 2006

(51) Int. Cl.
*G06F 21/00* (2006.01)
*H04L 9/00* (2006.01)
*H04K 1/00* (2006.01)
(52) U.S. Cl. ............................. 713/164; 713/189; 726/1
(58) Field of Classification Search ........................ None
See application file for complete search history.

(56) References Cited

U.S. PATENT DOCUMENTS

| 5,495,411 | A | | 2/1996 | Ananda |
| 5,715,174 | A | | 2/1998 | Cotichini et al. |
| 5,748,084 | A | | 5/1998 | Isikoff |
| 5,896,499 | A | | 4/1999 | McKelvey |
| 5,968,176 | A | * | 10/1999 | Nessett et al. ................. 726/11 |
| 6,044,471 | A | | 3/2000 | Colvin |
| 6,229,731 | B1 | | 5/2001 | Kasai et al. |
| 6,272,560 | B1 | * | 8/2001 | Kenton et al. .................. 710/8 |
| 6,321,334 | B1 | * | 11/2001 | Jerger et al. ..................... 726/1 |
| 6,446,092 | B1 | | 9/2002 | Sutter |
| 6,799,277 | B2 | | 9/2004 | Colvin |
| 6,926,199 | B2 | * | 8/2005 | Jay et al. ..................... 235/375 |
| 6,983,379 | B1 | * | 1/2006 | Spalink et al. ................. 705/10 |
| 6,986,063 | B2 | | 1/2006 | Colvin |
| 7,028,180 | B1 | * | 4/2006 | Aull et al. ..................... 713/156 |
| 7,222,104 | B2 | * | 5/2007 | Tadayon et al. ................ 705/54 |
| 7,360,251 | B2 | * | 4/2008 | Spalink et al. ................. 726/26 |
| 2006/0021005 | A1 | * | 1/2006 | Williams et al. ................ 726/2 |
| 2006/0021006 | A1 | * | 1/2006 | Rensin et al. .................. 726/2 |

(Continued)

FOREIGN PATENT DOCUMENTS

WO WO 2006/012457 A1 * 2/2006

OTHER PUBLICATIONS

International Search Report from corresponding PCT application No. PCT/US2005/25948, Nov. 25, 2005.

*Primary Examiner*—Christopher A Revak
(74) *Attorney, Agent, or Firm*—Pillsbury Winthrop Shaw Pittman LLP

(57) ABSTRACT

A data security system and method protects stored data from unauthorized access. According to one aspect of the invention, a client computing device communicates periodically with a server. If communications is note established between the client and the server for a selected activation interval and a subsequent grace period, the data is determined to be lost, and programmed security rules are automatically executed. Rules relating to encryption, as well as other security procedures, can be defined and entered by an administrator with access to the server, and then disseminated to each of a plurality of clients that access the server.

6 Claims, 7 Drawing Sheets

U.S. PATENT DOCUMENTS

2006/0021007 A1    1/2006  Rensin et al.
2006/0112427 A1*   5/2006  Shahbazi .................... 726/16
2006/0236408 A1*  10/2006  Yan ........................... 726/29
2007/0157287 A1*   7/2007  Lim ............................. 726/1
2007/0186275 A1*   8/2007  Shahbazi .................... 726/2
2007/0204323 A1*   8/2007  Wilkinson et al. ............ 726/1

* cited by examiner

SYSTEM AND METHOD FOR LOST DATA DESTRUCTION OF ELECTRONIC DATA STORED ON PORTABLE ELECTRONIC DEVICES

RELATED APPLICATIONS

The present application is related to co-pending U.S. patent application Ser. No. 10/897,306 filed Jul. 21, 2004, entitled "A System And Method For Lost Data Destruction Of Electronic Data Stored On A Portable Electronic Device Using A Security Interval" and to co-pending U.S. patent application Ser. No. 10/897,307 filed Jul. 21, 2004 and entitled "A System And Method For Lost Data Destruction Of Electronic Data Stored On A Portable Electronic Device Which Communicates With Servers That Are Inside Of And Outside Of A Firewall," which are expressly incorporated by reference herein.

BACKGROUND OF THE INVENTION

1. Field of the Invention

Generally, the present invention relates to data security and access control. More specifically, the present invention relates to networks of computing systems and remote management of stored data to prevent unauthorized users from accessing sensitive data stored on a lost or stolen computing system

2. Description of Related Art

Electronic information is frequently stored on programmable devices, often on devices that are designed for mobility. The electronic information stored on these programmable devices is susceptible to misappropriation through loss, theft, or unauthorized use of the programmable devices. Commonly used access control methods use, for example, a combination of user identification ("userid") and a password to allow or disallow users to access the programmable devices. However, userids and passwords provide only limited protection and can be circumvented.

Data encryption is often used as a primary protection technique to conceal electronic information contained in files, packets or other quantities of data. Data encryption uses encryption keys to control the concealment process and the encrypted information is restored only if the encryption keys are available. Encryption cannot guarantee that the concealed data will remain secure because the encryption keys may be discovered by computer driven trial and error processes.

Further, data erasure may leave vestiges of erased files on data storage devices and thus erasure of data may not conceal or protect information. After erasure or overwriting, sophisticated tools may detect variations in storage media that can be used to reconstruct the previously stored data.

SUMMARY OF THE INVENTION

The current invention provides a system and a method that reduces or eliminates the risk of exposing sensitive electronic information to access by unauthorized users of compromised programmable devices. The current invention provides a plurality of methods for identifying compromised programmable device through the detection of loss, theft and attempted unauthorized access of the programmable devices and any sensitive information stored therein. Further, the current invention protects an owner of sensitive information by providing methods for rapid, targeted destruction of the sensitive information stored on the compromised programmable device thereby reducing the risk that data may be reconstructed after erasure by an unauthorized user of the compromised programmable device.

Implementations of the current invention include a client, a central controller server and a communications link. The client and the central controller server are connected using the communications link. The client may be a programmable device such as another server, a desktop computer, a notebook computer, a handheld computer, an electronic organizer, a personal data assistant, a cellular telephone, a multimedia entertainment system, a network router, a network switch or a network edge device. An agent may be embedded in the client or in a storage device connected to the client. The agent controls access to stored data independently of the central controller server, providing a plurality of services including encryption, lost data destruction, communications monitoring and system security monitoring.

The agent implements a set of security rules propagated by the central controller server. The security rules may direct the agent to organize stored information into a plurality of files, directories, sections and blocks. The security rules may assign attributes to the files, directories, sections and blocks which, for example, determine prioritized security levels based on information type, information size, time sensitivity of the information, uniqueness of the information and importance of the information. In some embodiments, the security rules may also select processes associated with each file, directory, section and block wherein the processes include methods including encryption, destruction, user authentication and other processes used in the protection, handling and manipulation of the information.

The security rules may specify the indicia used to determine when the security of the programmable device has been compromised. The security rules may determine the type and frequency of device monitoring performed by the agent and may describe combinations of events and system status that represent threats to the security of the stored information.

The security rules may establish actions and procedures initiated by the agent to monitor and protect the security of the stored information. The actions and procedures specified by the rules include methods to encrypt data and methods to erase data. The encryption and data erasure methods may be implemented using a combination of services and functions provided by components intrinsic and extrinsic to the client including components such as operating systems, storage devices, commercially available software and open-source software. Further, the security rules may include time-sensitive rules including rules that cause the deletion of selected data at a specified date and time.

In some embodiments, the agent initiates encryption automatically upon the client receiving a copy of the set of rules propagated by the central controller server. After the client successfully receives the rules, the agent reviews the encryption rules and verifies the encryption status of all files designated by the rules to be encrypted. In some embodiments, encryption may also be performed by the agent following the occurrence of certain system events such as power on, power off, intrusion detection, invalid login attempts and detection that the client has been lost or stolen.

The client communicates with the central controller server at selected, regular intervals using the communications link. Successful communication may comprise a transmittal of status information by the client and a transmittal of status and rules by the central controller server. After each successful communication between the central controller server and the client, the agent starts a first timer that measures the period of time that the communications link is inoperative. If the communications link is inoperative for a period greater than a selected "activation interval," then the agent will determine that the client has been lost or stolen or otherwise compromised. Since the activation interval can elapse while the client is turned off, once the client is first turned on after the activation interval has elapsed or if on when the activation interval elapses, the agent then start a second timer. The second timer measures a second time period during which the user may be periodically notified of the loss of communications with the central controller. If the second time period exceeds a selected "grace period," then the agent will initiate programmed events, which may include the destruction of certain of the stored data. In some embodiments, the user may reset the activation timer and the grace timer during the grace period by providing one or more identity authentications such as a password.

In some embodiments of the invention, the activation interval is measured as an elapsed time that includes the time when the programmable device is powered off or otherwise inoperable. In some embodiments, the grace period measures only time during which the device is powered on and operational. When the grace period exceeds a selected maximum grace period, the agent determines that the stored data is lost, and proceed to execute rules that will cause security enhancing events to automatically occur. If the grace period is selected as zero, then immediately after the elapsing of the activation interval, the agent will initiate the programmed events.

The agent may also determine that the stored data is lost in other ways including excessive invalid login attempts and by system administrator notification. The agent may monitor the programmable device to detect indicators of attempts at unauthorized access such as invalid login attempts and security log entries. A system administrator may make an entry on the system controller server designating the stored data as lost. The designation may be made in the form of a lost/stolen status value transmitted to the agent and may be reflected in the security rules associated with the device. Upon receiving the status value, the agent initiates lost data actions.

When it is established that the stored data is lost after the elapsing of the grace period, the agent initiates a process (known hereinafter as "Lost Data Destruction") comprising a plurality of actions to erase the stored data. Embodiments of the invention implement lost data destruction through a combination of processes including data erasure, prioritized data overwrite, selective encryption, destruction of stored encryption keys, destruction of rules, forced system shutdown and physical device disablement. Some embodiments may disguise the lost data destruction activity by eliminating all external signs of system activity or by providing incorrect system status information.

The present invention provides a data erasure method that significantly reduces the risk that erased data may be recovered by analysis of the physical, electrical and electromagnetic characteristics of the storage device. The method obliterates files by repetitively filling the file with randomly generated sets of data, using different randomly generated sets of data on each repetition. Some embodiments of the invention may obliterate files by filling the file once with a randomly generated set of data. The data erasure method removes or obscures vestigial impressions of previously stored data from storage devices.

A particular embodiment describes a system and method in which a central controller server is configured to automatically provide of an automatic encryption function. In the exemplary embodiment, automatic encryption of certain files is performed based upon established encryption rules that will result in automatic encryption events. These encryption rules can be established for all files of a certain type and can be identified by an administrator for all clients that communicate with the central controller server. Once the automatic encryption rule is established or updated, it can be disseminated to the rules set for each different client 10, and then implemented after the rules are downloaded the next time each client connects to the central controller server.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF A PREFERRED EMBODIMENT OF THE INVENTION

The present invention will now be described in detail with reference to the drawings, which are provided as illustrative examples of the invention so as to enable those skilled in the art to practice the invention. Notably, the figures and examples below are not meant to limit the scope of the present invention. Where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the components referred to herein by way of illustration.

Figure 1:
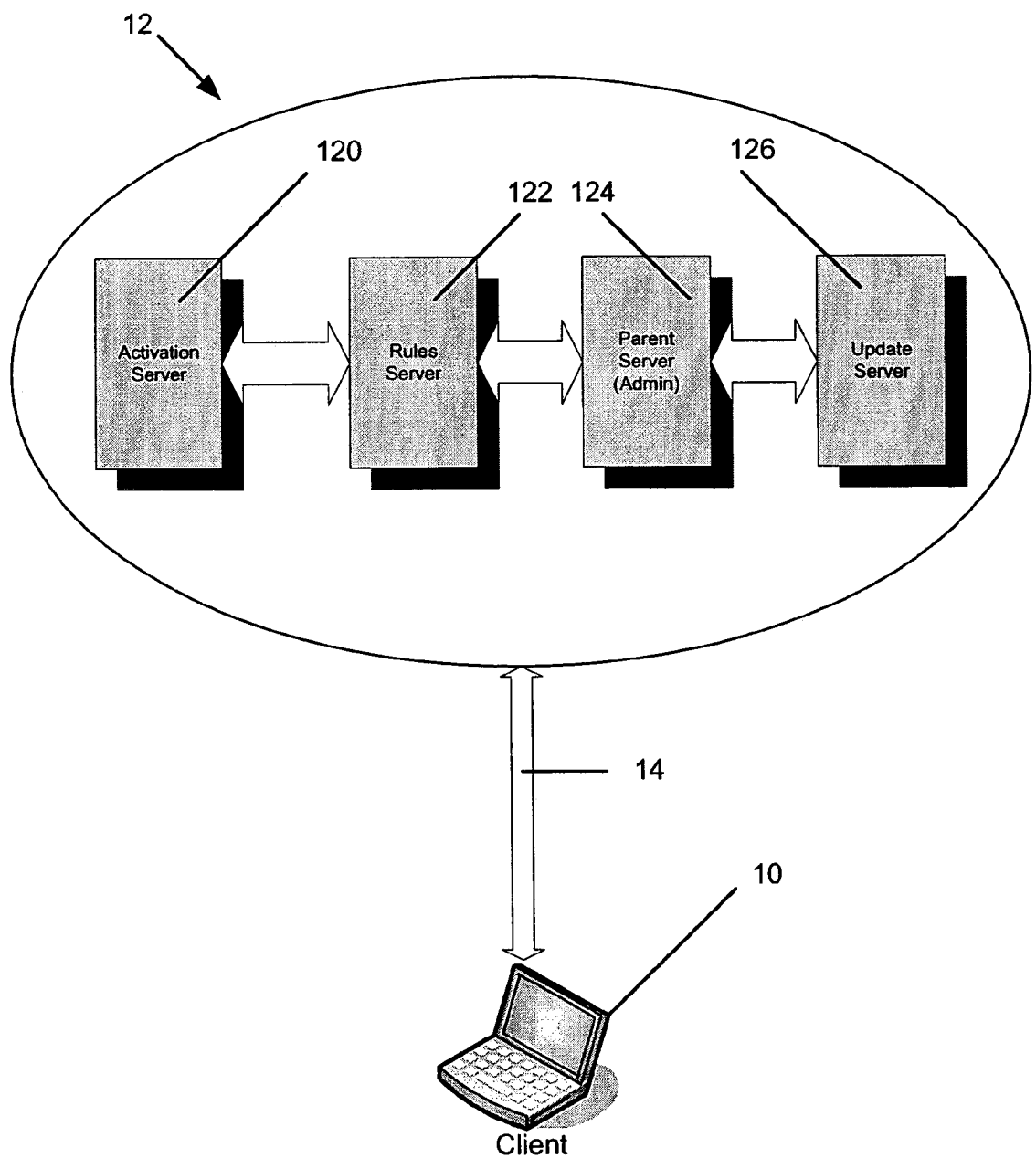
FIG. 1 is a block representation of an exemplary embodiment of the invention.

FIG. 1 shows an exemplary embodiment of the present invention comprising a client 10 and a central controller server 12 including an activation server 120, a rules server 122, a parent server 124 and an update server 126. These various identifications of server 12 as including servers 120-126 are provided solely for purposes of discussion, and it is understood that unless described otherwise hereinafter with respect to specific embodiments, a single physical server, or various different physical servers, can be used to implement the different functionalities described herein with respect to each server 120-126, and that not all of the functionalities of each of the different servers 120-126 are needed to implement various different aspects of the present invention. As a primary focus of the present invention is the security of electronic data stored on the client 10, the type of server 12, including its various different hardware and software components, as well as the configuration of server(s), is not of particular significance, and as such many different combinations of hardware and software components can be used to implement the central controller server.

The client 10 may be a programmable device such as a desktop computer, a server, a notebook computer, a handheld computer, a Personal Data Assistant (PDA), a network router, a cellular telephone, multimedia entertainment system, network router, network switch, network edge device or any other device that is capable of storing data. A common aspect of the different types of client 10 referred to above is that each client 10 will include a processor of some type that is capable of executing an operating system of some type, and applications thereon, and that electronic data is stored on memory of some type. In the exemplary embodiment, the client 10 is a notebook computer upon which a Microsoft® Windows XP Professional operating system 220 is installed, and, as such, familiarity with the features of this operating system, including Encrypting File System (EFS), is assumed. Further, the operating system runs with a compatible processor, such as an Intel® processor. Notwithstanding the above, other operating systems, such as Linux, Solaris, Palm OS or Pocket PC, only by way of example, and processors, such as manufactured by AMD, MIPS, Tensilica, ARM, or Transmeta, only by way of example, can be used with the present invention. It will be apparent that that less powerful devices 10 will typically have simpler processors, operating systems, and features, and as such less powerful devices 10 may not be able to implement all the features described herein.

The activation server 120 maintains a set of status information related to the client 10. A typical set of status information is provided below in Table I.

TABLE I

| Date | Time | Status | Event |
|------|------|--------|-------|
| 20040714 | 08:01:15 | OK | System Boot |
| 20040714 | 09:15:20 | Unable to connect | Connect (60 minutes) |
| 20040714 | 09:30:45 | OK | Lock |
| 20040714 | 09:29:59 | Alert | Invalid Logon |
| 20040714 | 09:45:52 | OK | Unlock |
| 20040714 | 10:45:00 | OK | Connect (60 minutes) |
| 20040714 | 11:45:00 | OK | Connect (60 minutes) |
| 20040714 | 12:45:00 | OK | Connect (60 minutes) |
| 20040714 | 13:15:00 | OK | Shutdown Device |

A system administrator may change the contents of the set of status information; for example, when the client 10 is reported lost or stolen the system administrator may set a Lost/Stolen flag in the set of status information. The set of status information is updated by the client 10 when the client 10 connects with the activation server 120. The activation server 120 transfers a copy of the set of status information to the client 10.

The rules server 122 maintains the set of rules used by the client 10. The set of rules may describe the configuration of the client 10, set decision-making criteria for the client 10 and initiate actions and processes to protect stored data. The set of rules may be modified manually by an administrator or automatically in response to changes in status information received from the client 10. The client 10 periodically communicates with the rules server 122 and the rules server 122 transfers the set of rules or updates to the set of rules to the client 10. A typical rules set, along with a description of each rule, is provided below in Table II.

TABLE II

| Event Detected | Rule Executed | Description |
|---|---|---|
| GetRulesSuccess | AutoCrypt (Desktop) | All files residing on the desktop are encrypted immediately after the rules set is retrieved by the agent |
| Invalid Logon | Shutdown-3 | Agent shutdowns the device on the third invalid logon event |
| Invalid Logon | Secure Delete (Keys)-4 | On the fourth invalid logon event, the agent overwrites and deletes the encryption keys |
| Invalid Logon | Secure Delete(Desktop)-5 | On the fifth invalid logon event, all files residing on the desktop are overwritten and deleted |
| Invalid Logon | Secure Delete(Identity)-6 | On the sixth invalid logon, the mail database, browser cache, and passwords stored by the operating system are overwritten and deleted |
| Invalid Logon | Delete Files(MS Office)-6 | On the seventh invalid logon, the agent deletes all MS Office documents residing on the device using *.doc, *.xls, *.ppt |
| | Activation Interval | Activation Interval set to 7 days and Grace Period set to 15 minutes |

The set of rules and the set of status information are used to select actions to be taken in response to changing circumstances. For example, the agent uses the set of rules to determine actions to taken when Lost/Stolen flag indicates that the client 10 has been lost or stolen.

The parent server 124 is an administrative server that is used by system administrators to perform tasks such as updating client status, creating and assigning rules, designating user groups containing one or more clients 10, initiating client software updates and generating reports. The parent server 124 may also be used by the system administrators to associate security properties with data, the security properties including definitions such as information type, information size, time sensitivity of the information, uniqueness of the information and importance of the information. The parent server 124 may also allow the administrators to group similar data into files, directories and other organizational forms. Data may be similar if, for example, it possesses the same security properties, is located in a common directory or is in a format used by a common software application such as a word processing application. The update server 126 is used to distribute software and software updates to the client 10 or to groups of clients and the Activation, Rules, Parent, and Update servers.

Figure 2:
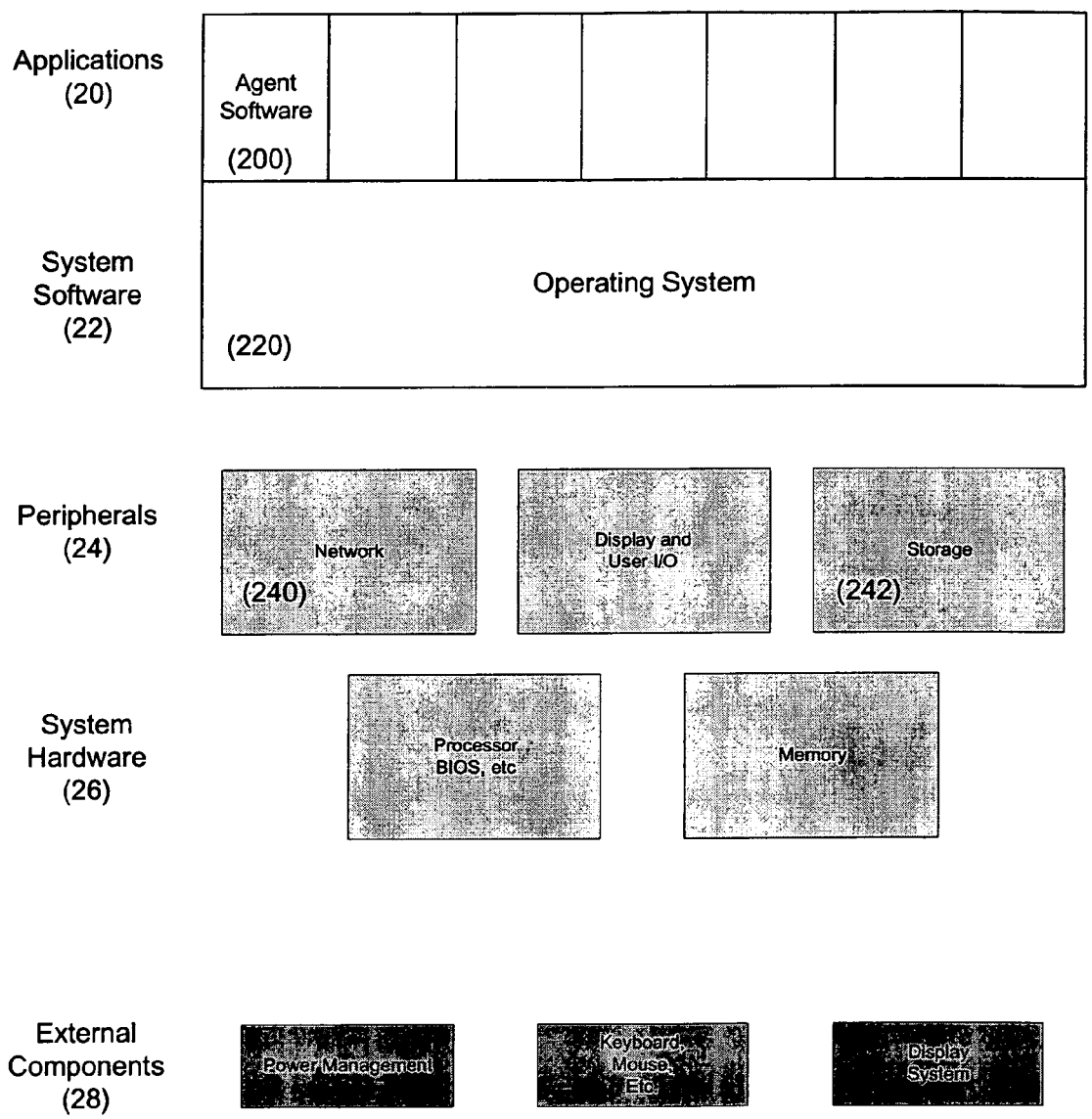
FIG. 2 is a functional representation of the structure of an exemplary client.
Figure 3:
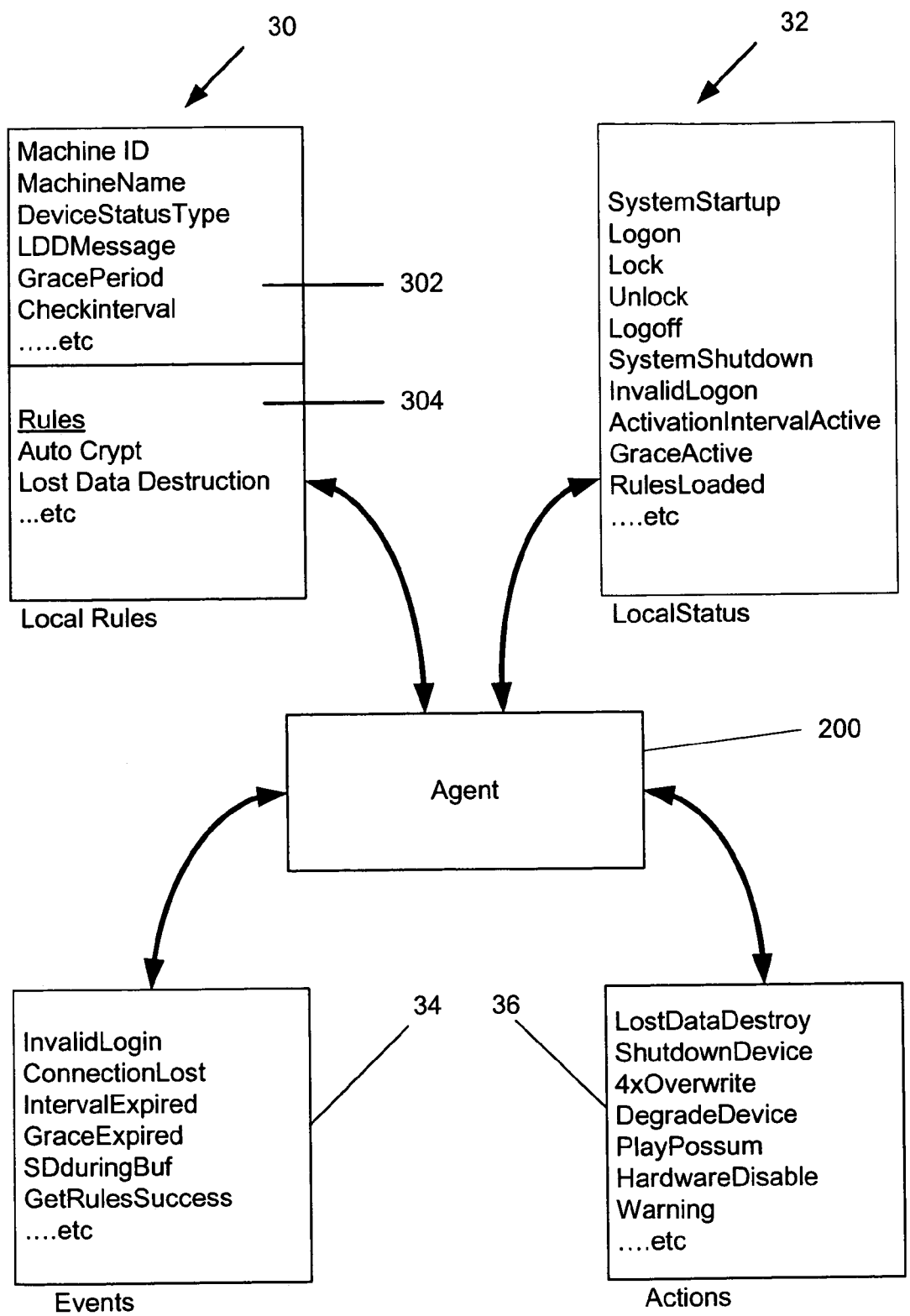
FIG. 3 is a block representation of the relationships between status, rules, events and actions as implemented in the exemplary embodiment.

Referring now to FIGS. 1, 2 and 3, the operation of the client 10 may be better understood in the context of the exemplary embodiment. A functional diagram of the client 10 is shown in FIG. 2.

As illustrated in FIG. 2, the client 10 comprises a variety of components including application software 20, system software 22, device specific peripherals 24, hardware components 26 and optional external components 28. It is noted that the memory component of the hardware components 26 can take various forms, including, for example, on-board processor cache memory, RAM (with various types, such as static, dynamic, EDO . . . to implement various registers, cache, and other features), ROM, flash memory (particularly used to store BIOS routines). Electronic data stored within memory of the hardware components can be individually accessed through calls made by the operating system, as is known, and familiarity with such requests for such different types of accesses is assumed.

Referring now to FIG. 3, one aspect of the present invention is the capability of the agent 200 to operate independently, without direct control of the server 12, the administrator or the user of the client 10. Thus, while at certain times the client 10 is connected to the server 12 by a communications link 14, when the client 10 is disconnected, the present invention still ensures security over the electronic data stored within the client 10. The operation of the client 10 is directed by configuration information 30 maintained on the client 10. The configuration information comprises system information 302 and a local copy of rules ("local rules") 304 obtained from the rules server 122. The system information 302 includes client 10 configuration information, agent. 200 configuration information, operating system 220 configuration information and communications link 14 configuration information. Table III {below} illustrates the type of information maintained as configuration information in an exemplary embodiment, along with descriptions of the information content.

TABLE III

| Configuration Parameter | Description |
| --- | --- |
| PrimaryServerAddress | Primary IP address for server |
| SecondaryServerAddress | Secondary IP address for server |
| MachineID | Unique alphanumeric machine identifier (Format: xxxxxx-xxxx-xxxx-xxxx-xxxxxxxx) |
| MachineName | Windows Full computer name |
| DeviceStatus | The status of the device including: OK, Lost, Stolen, Out-of-Office, Deactivate |
| LDDMessage | The message displayed when the Activation Interval has expired |
| GracePeriod | The time value (minutes, hours, or days) for the Grace Period |
| CheckinInterval | A time value, such as 1 hour, which forces the agent to connect to the server on a recurring basis |
| ActivationInterval | The time value (minutes, hours, or days) for the Activation Interval |
| DateCreated | The system date and time for the server, indicating when the file was created |
| AccountID | The alphanumeric identifier for the user account (Format: xxxxxx-xxxx-xxxx-xxxx-xxxxxxxx) |

By way of example, Table IV shows the format of each of the rules stored in the local rules 304.

TABLE IV

| Parameter | Description |
| --- | --- |
| Trigger | Possible values are Invalid Logon, AutoCrypt, etc. |
| TriggerParam | Depends upon the value of the Trigger. If it is Invalid Logon, then TriggerParam is a value between 3 and 15. |
| Action | Possible values are Delete Files, Overwrite (4x), Secure Delete, etc. |
| ActionParam | Usually file and folder pathnames pertaining to the Action parameter |
| Active | Boolean value indicating the rule is active or inactive. Note: Rules remain assigned to the device until removed by the administrator using the server interface. |
| StartTime | A date/time value indicating the effective (start) date for the rule. Rules can be preloaded onto a device using this option and activated without direction from the server. |
| EndTime | A date/time value indication when a rule should |

TABLE IV-continued

| Parameter | Description |
| --- | --- |
| | be automatically deactivated by the agent. Allows rules to be automatically deactivated by the agent, without direction from the server. |
| RuleID | Unique alphanumeric identifier (Format: xxxxxx-xxxx-xxxx-xxxx-xxxxxxxx) |

The agent 200 gathers and stores status (the "local status") 32 describing the discernible state of the client 10. The discernible state may be a set of data containing, for example, a snapshot of information captured from the client 10 related to client 10 activities such as user login and logout, lists of applications running on the client 10, memory capacity, etc. The agent 200 may obtain the discernible state from services provided by a plurality of sources including the activation server 120, the rules server 122, the parent server 124, the update server 126, the operating system 220, the agent 200, system hardware 26 and individual components of the client 10 such as the network interface 240. The agent 200 may transmit the local status 32 to server 12, when connected, according to a schedule defined by the configuration information 30. Table V, below, illustrates an exemplary format for storing status information, wherein the information comprises a notification that a rule has been triggered.

TABLE V

| Parameter | Description |
| --- | --- |
| AccountID | The alphanumeric identifier for the user account (Format: xxxxxx-xxxx-xxxx-xxxx-xxxxxxxx) |
| MachineID | Unique alphanumeric machine identifier (Format: xxxxxx-xxxx-xxxx-xxxx-xxxxxxxx) |
| Rule.ID | Unique alphanumeric identifier for the rule which was triggered (Format: xxxxxxxxx-xxxx-xxxx-xxxxxxxx) |
| System.DateTime.Now | The system date/time for the client when the rule was triggered (Format: YYYYMMDDMMSS) |

The agent 200 generates events 34 and initiates actions 36 based on criteria derived from the configuration information 30 and the local status 32. The generated events 34 may be used to signal changes in the state of the agent 200 as it executes local rules 304. For example, the agent 200 may generate a timeout event when a timer expires. The actions 36 include a combination of processes, utilities, operating system 220 services, applications 20 and processor instructions, depending upon function desired. The actions 36 may be initiated by the agent 200 to perform a variety of functions including data eradication, user validation, data destruction, client 10 shutdown, communications with the server 12 and hardware disablement. Specific events, based upon specific rules, which result in specific actions, that are advantageous are described further hereinafter.

Figure 4:
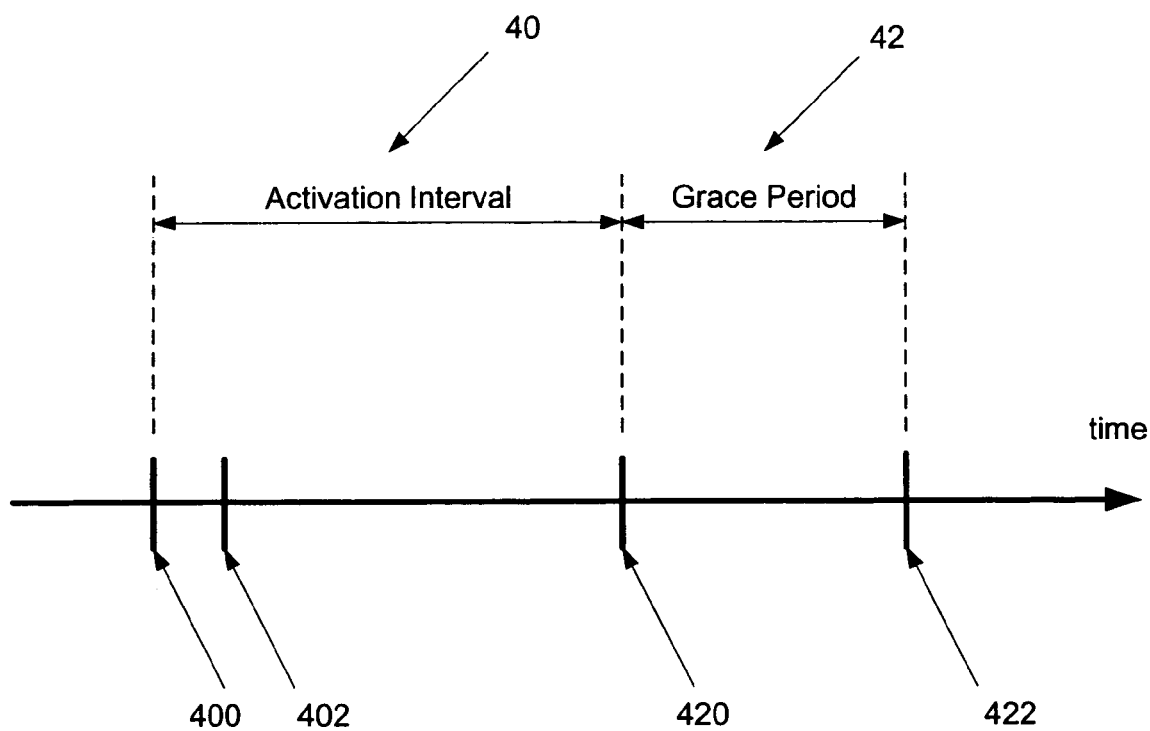
FIG. 4 is an exemplary representation of the timing protocol governing communications between a central controller and a programmable device.

Now referring also to FIG. 4, a protocol for determining that data has been lost may be understood in context of the exemplary embodiment. The client 10 attempts to contact the server 12. Upon establishing a connection with the server 12, the agent 200 initiates transmission of a local status 321 to the parent server 124. The activation server 122 responds to communication from the agent 200 by transmitting a current set of status information to the agent 200 to be merged with the local status 32. The rules server 122 also responds to communication from the agent 200 by transmitting a current set of rules (including both modifications caused by the local status 32 as well as modifications of additional rules being added, such as by an administrator) to the agent 200 to replace the previous version of the local rules 304. Upon replacing the previous version of the local rules 304 with a new version, the agent also initiates a first timer at 400 (the "activation timer") to measure a first time period (the "activation interval") 40. It is understood, however, that while in the preferred embodiment the local set of rules is replaced to initiate the activation interval 40, that other manners of initiating the activation interval can be used, since it may not be desired to completely replace the local set of rules each time the client 10 connects to the server 12. The agent 200 updates the local status 32, creates at least one event 34 and may initiate actions 36. An event, hereinafter referred to as the "GetRulesSuccess" event, is created indicating that a successful communication occurred.

The activation interval 40 is a measure of time elapsed since the rules were loaded signifying successful communication with the rules server 122. When the agent 200 is unable to establish a connection with the server 12 within the activation interval, the agent updates status 32 and creates one or more events 34 indicating a loss of connection between the agent 200 and the server 12. The activation interval 40 is determined by the configuration information 30 and is a real-time measurement that includes time during which the client 10 is powered off and non-functioning. In some embodiments, the agent 200 warns the user at regular intervals that are less than the activation interval 420 how close the client 10 is to the activation interval 420 elapsing, as determined by the configuration information 30.

If the client 10 connects to the activation server 120 prior to the elapsing of the activation interval, then the server 12 sends a signal, which can be a reset signal, the updated rules, or some other indicator, to reset the activation timer to begin its count again. If the client 10 and the activation server remain connected, the signal can then be periodically resent before expiration of the activation interval.

When the time period measured by the activation timer exceeds the activation interval at 420 and the signal is not received by the client 10, the agent 200 may initiate a second timer (the "grace timer") that measures a time period referred to herein as the "grace period" 42 if the grace period is not set to zero. The grace timer and the activation timer may be reset by any subsequent GetRulesSuccess event. During the grace period 42, if communication between the client 10 and the server 12 is established, the agent 200 may warn a user that communication with the server 12 has been lost if the activation timer has not yet been reset. In some embodiments, the warning may include a prompt to enter a password wherein, if the user enters a correct password, the activation timer is reset. Further, in some embodiments, the agent 200 warns the user at regular intervals during the grace period, as determined by the configuration information 30, that communication between the client 10 and the server 12 has not been established, which communication, as described herein, is necessary in order to reset the activation timer, and prevent the programmed security features from occurring, as described herein, once the grace period elapses. After the grace period, as determined by the configuration information 30, the grace timer expires 422. The grace timer measures only the time that the client 10 is powered on after the activation interval has expired 420. Upon detecting that the grace timer has expired 422, or detecting that there is no grace period, the agent 120 will update status 22, and implement the programmed security features based upon the rules, thereby creating events 26 that will initiate a plurality of actions 28, which can include, for example, encryption of data, destruction of encryption keys, destruction of data, hardware disablement and device shutdown. If the grace period is selected as zero, then immediately after the elapsing of the activation interval, the agent will initiate the programmed events. For certain applications in which security is an overriding concern, the activation interval can be kept running, although the rest of the client 10 is turned off, such that upon the elapsing of the activation interval, other parts of client 10 need to implement the programmed security features are automatically turned on and the programmed security features based upon the rules are initiated. For most applications, however, a grace period will be set in order to allow a user to turn on the client 10 and have a period of time to connect to the server 12 before the initiation of programmed security features that occur upon expiration of the grace period.

It is further noted that in a preferred embodiment, upon the expiration of the grace period, the programmed security features will secure data in a prioritized manner, such that the most important data is destroyed or encrypted first, and subsequently less important data is destroyed or encrypted. For example, a prioritized destruction of registries, encryption keys or other such information may have the effect of a rapid destruction of large quantities of data by rendering the large quantities of data unreachable or unusable. Further, a system administrator may be able to recover the large quantities of data if the system administrator maintains backup copies of the registries, encryption keys or other such information elsewhere, on the central controller server 12, for example.

The agent 200 may also determine that the risk of data loss is imminent by detecting invalid access attempts. In the exemplary embodiment, the agent 200 detects invalid access attempts by monitoring display messages including Login messages and "Computer Locked" messages. The agent 200 may also detect invalid access attempts by monitoring the operating system 220 security log. Upon each invalid attempt at access the agent may update local status 32, create one or more events 34, initiate or more actions 36 and send one or more messages to the Parent server 124. In some embodiments, the agent 200 may be directed to destroy selected data after a delay, where the delay may be measured by a clock or timer implemented by, for example, system hardware 26 or system software 22.

It will be appreciated that other methods and user behaviors may be used to determining that data is at risk of imminent loss. The behaviors include: failure to use a proper biometric (e.g., finger, facial, signature, voice) information; failure to use a valid token, failure to login effectively with multiple attempts at passwords from biometrics, tokens or any non-typed entry; attempts to log-in as an unauthorized user on a device (including guest and administrator); once logged in, behaviors that are inconsistent with anticipated norms (e.g., attempts to visit restricted web sites, failed password attempts with proprietary software, or failed server access attempts); unanticipated changes in hardware or software configuration (i.e., disablement of an existing functionality such as security software, GPS, a communication card, or some other PC card or motherboard capability, or enablement of a new software or hardware element such as a registry settings, PC card or a port hook-up to an unknown device); and calls, warnings and error messages from the operating system 220 or third party software indicating attempts to access proprietary software.

Figure 5:
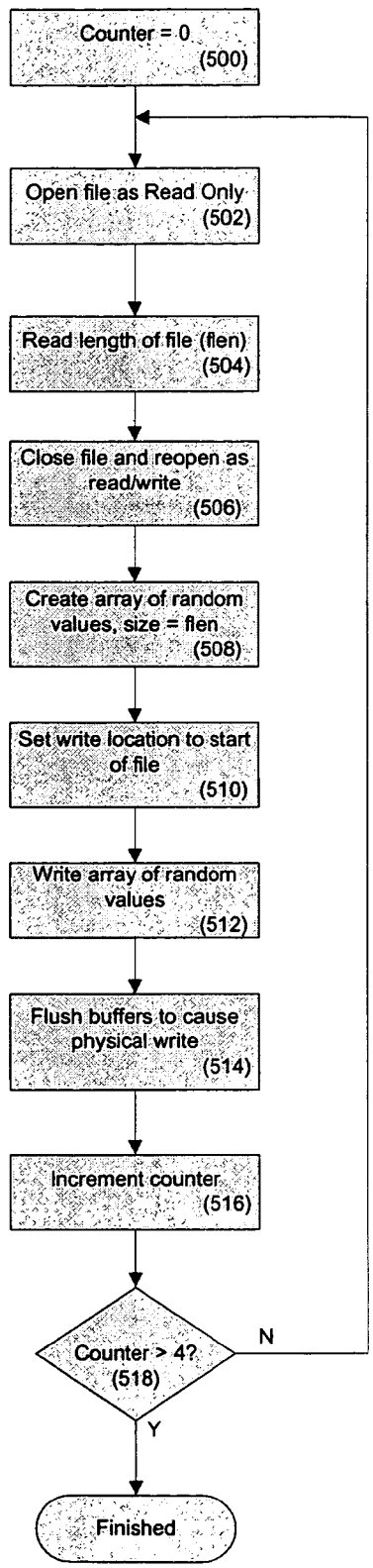
FIG. 5 is a flowchart that describes an exemplary implementation of 4×Overwrite.

Embodiments of the invention use a secure method for erasing data referred to hereinafter as "Multiple Overwrite." FIG. 5, viewed in conjunction with FIGS. 2 and 3, illustrates Multiple Overwrite applied to the exemplary embodiment, wherein the data storage system 242 comprises one or more data storage devices and a file system. The data storage devices may include fixed magnetic disks, removable magnetic or optical disks and flash memory. Multiple Overwrite is invoked by the agent 200 according to the local rules 304. The local rules 304 also identify one or more files to be erased by Multiple Overwrite and specify events 34 that trigger the erasure of the one or more files.

Multiple Overwrite may be implemented by repeating a series of operations a selected number of times. In the exemplary embodiment, the selected number is 4. In other embodiments, criteria for selecting the number of repetitions include the characteristics of the storage device 242 and the local rules 304. In FIG. 5, a counter is initialized to zero at step 500 and tested at step 518, thereby forming a loop counter of maximum value 4. Hence the loop from step 502 until step 518 is executed four times.

Multiple Overwrite comprises an algorithm that includes determining the length of a target file, creating a set of random data and filling the entire target file with the random data. In the exemplary embodiment, the agent 200 determines the length of the target file by opening the target file in read-only mode 502 and obtaining the length of the target file 504. The agent then prepares the file for overwrite by closing the target file and subsequently reopening the target file in writeable mode 506. The agent 200 creates a random set of data 508 that is equal in size to the target file. The agent writes the random set of data to the target file as shown in steps 510-514. The counter is incremented 516 and tested 518 to determine if four cycles have been completed.

Referring now to FIGS. 2 and 3, embodiments of the invention may disguise data protection operations by deceptively causing activity or non-activity of one or more components of the client. This aspect of the invention, known hereinafter as "Possum Mode," is initiated by the agent according to the local rules 304. In the exemplary embodiment, Possum Mode may be initiated by the agent 200 after the activation interval has expired, or after the Grace Period 42 has expired or when an invalid login attempt is detected. In Possum Mode, the agent 200 hides or exposes specific indicators such as power on indicators, hard disk activity indicators, information displayed on display systems, keyboard function indicators, audio indicators and network connectivity indicators. In some embodiments, when Possum Mode is activated, the agent 200 may permit an intruder to operate the client 10 while the agent 200 is actively destroying data, particularly if the processor supports multiple threads.

Referring now to FIGS. 1 and 2, embodiments of the invention control access to individual components of the client 10 and may prevent unauthorized access to the client using a method herein referred to as "Hardware Disablement." Hardware disablement is implemented when the individual components include software that is controllable by the agent 200. Individual components that may have the controllable software include the system hardware 26 (using, for example, a modified BIOS), the system software 22, the data storage system 242 and the network interface 240. The agent 200 transmits commands to the controllable software that enable and disable access to components of the client 10, initiate erasure of data stored on the individual components and initiate encryption of data stored on the individual components. The commands may be software or hardware commands or a combination of hardware and software commands as required by the nature of the component receiving the command. For example, one skilled in the art will appreciate that a modified BIOS could be controlled by software commands such as a particular sequence of system calls or extended system calls.

In some embodiments where the data storage system 242 includes disk drives a version of the agent may be inserted as an "auto-run" agent on the disk drive. The auto-run agent executes whenever the disk drive is initiated and mounted by the operating system 220. The auto-run agent may execute a copy of the agent if, for example it detects that no agent is currently installed in the client 10 or the disk drive has been installed as a slave disk drive. The auto-run agent may then initiate actions including lost data destruction, automatic encryption, hardware disablement and device shutdown. In this manner, embodiments of the invention prevent unauthorized users from bypassing the security provided by the invention through the removal or slaving of disk drives.

Figure 6:
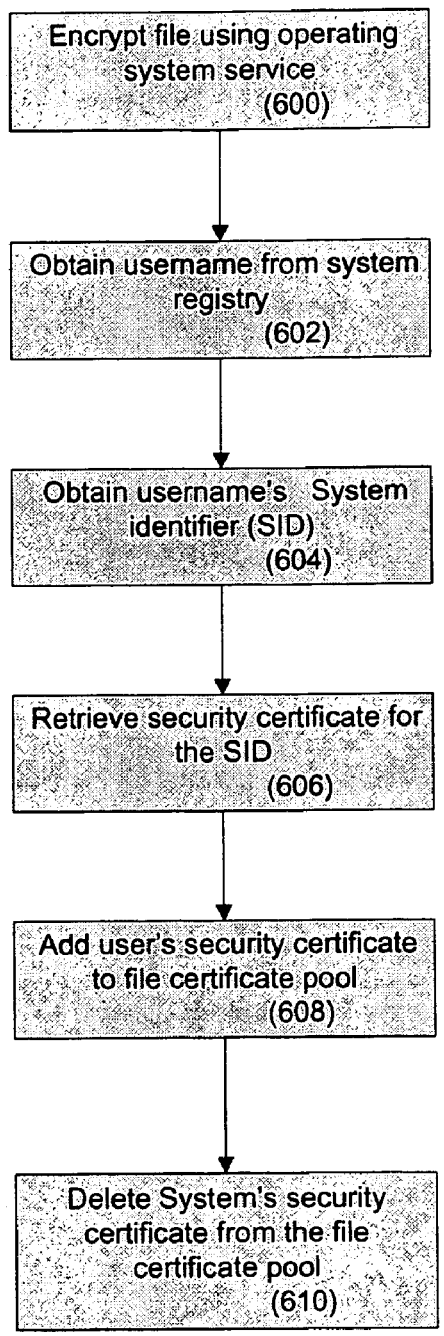
FIG. 6 is a flowchart that describes an exemplary implementation of the Auto Crypt function.

The flowchart shown in FIG. 6, viewed with FIGS. 2 and 3, shows an implementation of an automatic encryption function applicable to the exemplary embodiment. In the exemplary embodiment, automatic encryption of certain files is performed using Microsoft® Encrypting File System (EFS) referred to above or similar such utility depending upon the operating system being used to perform data encryption on one or more files or directories of files. Automatic encryption is performed based upon established encryption rules that will result in automatic encryption events. These encryption rules can be established for all files of a certain type (such as MS PowerPoint and Excel) which can be identified by an administrator for all clients 10 that are within the organization of that administrator and will communicate with the server 12. Once the automatic encryption rule is established or updated, it can be disseminated to the rules set for each different client 10, and then implemented after the rules are downloaded the next time each client 10 connects to the server 12. Once a particular client 10 has downloaded the rules set that includes the automatic encryption rule(s), the agent 200 initiates one or more system calls to the operating system. 220 that causes a selected file to be encrypted 600. The files are encrypted using a System certificate. The agent 200 then searches the operating system's 220 registry for a username 602 identifying the currently logged-in user of the system. The agent 200 obtains a system ID (SID) 604 associated with the username. The SID is a unique numerical identifier that may be subsequently used to obtain a related first security certificate 608. The agent 200 then causes the first security certificate to be entered in a pool of security certificates associated with the file 608, thereby providing access to the encryption keys for the current user. The agent 200 may delete a second security certificate from the pool 610 where the second security certificate is associated with the operating system's administrator or system user.

Figure 7:
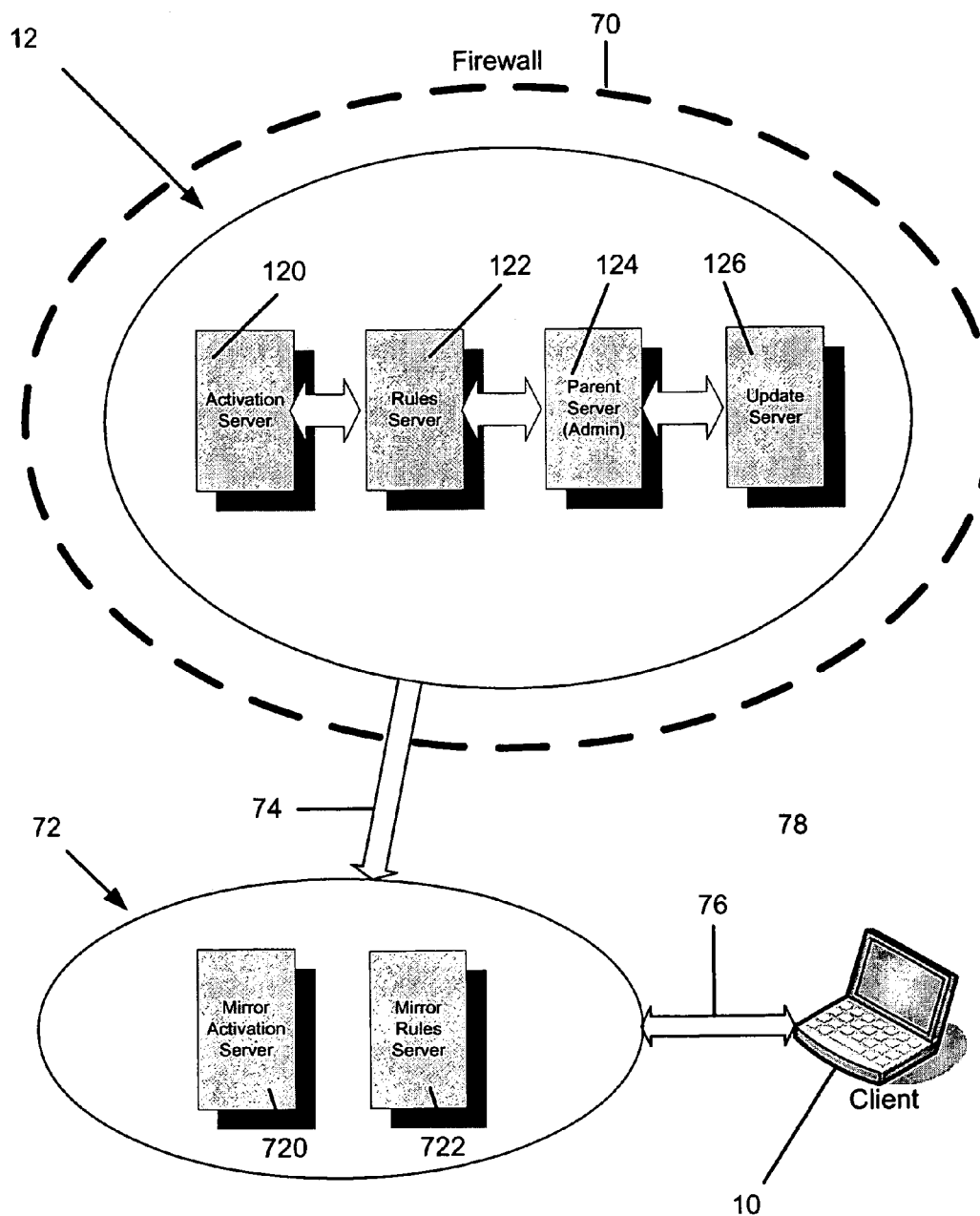
FIG. 7 illustrates an embodiment of the invention adapted to operate where a firewall is constructed between servers and clients.

Referring now to FIG. 7, an embodiment of the invention is shown that may be used in conjunction with a network firewall 70, in which there exists a 12 server located inside the firewall of a particular organization, as well one or more mirror servers 72 located outside of the firewall. The network firewall 70 prevents unauthorized access to the server 12 by a client 10 located outside the firewall 70. However, in order to maintain a degree of control over a client 10 when it is located outside of the firewall, one or more mirror servers 72 are located outside the firewall 70, where the one or more mirror servers 72 are accessible to the client 10 and are configured as copies of the server 12 behind the firewall 70. This allows for communication to effectuate the re-setting of the activation interval as well as the updating of the local rules set using any of one the mirror servers 72 implemented outside the firewall. The one or more mirror servers 72 may include a mirror activation server 720 and a mirror rules server 722. Thus the client 10 may receive rules and status information and a system administrator may modify the status and rules to affect the operation of the client 10. For example, the system administrator may set a Lost/Stolen flag in order to destroy data on a lost or stolen client 10. Accordingly, should there be a subsequent attempt to connect to the mirror server 72, that connection is established so that a rules update can take place to set the Lost/Stolen flag, and thereby initiate preprogrammed events, which events may be independent of events relating to the events that occur as a result of the elapsing of the grace period, such as system shutdown.

It is apparent that the above embodiments may be altered in many ways without departing from the scope of the invention. For example, the client may be a PDA, a server, a network router or other programmable device and the operating system may be any commercially available or proprietary operating system. Further, various aspects of a particular embodiment may contain patentably subject matter without regard to other aspects of the same embodiment. Still further, various aspects of different embodiments can be combined together. Accordingly, the scope of the invention should be determined by the following claims and their legal equivalents.

What is claimed is:

1. A method of automatically encrypting similar data stored on a plurality of electronic devices based upon encryption rules stored on another electronic device, comprising the steps of:

automatically creating a set of customized encryption rules for each of the plurality of electronic devices by replicating at least some of the encryption rules according to a predetermined mapping function and providing each set of customized rules in a storage area associated with the another electronic device;

upon connection of each one of the plurality of electronic devices with the another electronic device, automatically downloading the set of customized rules associated with the one electronic device to the one electronic device; and applying the rules on the one electronic device to encrypt the similar data stored thereon.

2. A method according to claim 1 wherein the plurality of electronic devices includes at least one portable electronic device.

3. A method according to claim 1 wherein the mapping function is generated by a system administrator using a software application to select certain of the encryption rules to be applied to groups of one or more electronic devices.

4. A method according to claim 1 wherein automatically creating includes generating the associated set of customized rules upon the connection of the one electronic device.

5. A method according to claim 1 wherein automatically creating includes generating each set of replicated rules and storing all generated sets in the storage area.

6. A method according to claim 1, wherein the one electronic device includes an operating system ("OS") having a file encryption system and applying the rules includes:

encrypting the similar data using file encryption system to create encrypted similar data;

accessing a pool of security certificates associated with the encrypted similar data, wherein the pool is maintained by the OS and the security certificates enable one or more OS users to generate encryption keys for encrypting and decrypting the similar data; and removing one or more security certificates from the pool to prevent selected users or groups of users from generating encryption keys for the similar data, wherein the users or groups of users are selected by the encryption rules.

* * * * *